E. BEHR.
BRAKE FOR WHEEL VEHICLES.
No. 29,453.                              Patented Aug. 7, 1860.
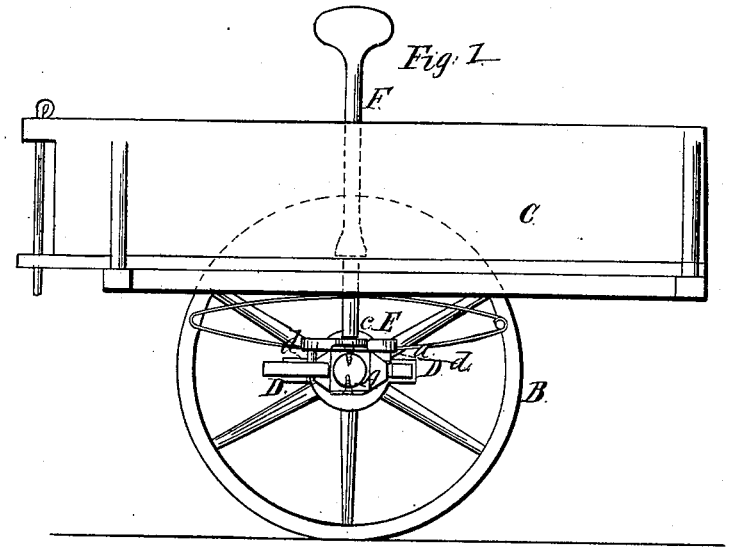
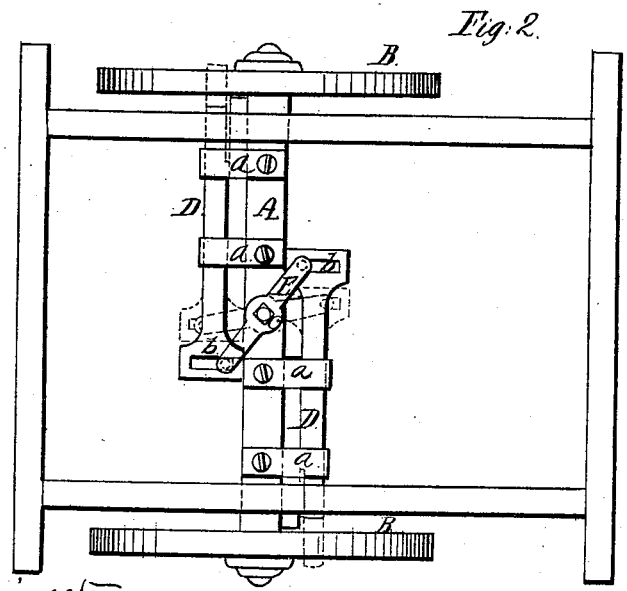
Witnesses:
M. M. Livingston
Mich Hughes
Inventor:
Edward Behr

UNITED STATES PATENT OFFICE.

EDWARD BEHR, OF NEW YORK, N. Y.

CARRIAGE-BRAKE.

Specification of Letters Patent No. 29,453, dated August 7, 1860.

*To all whom it may concern:*

Be it known that I, EDWARD BEHR, of the city, county, and State of New York, have invented a new and Improved Brake for Wheel-Vehicles; and I do hereby declare that the following is a full, clear, and exact description of the same, reference being had to the annexed drawings, making a part of this specification, in which—

Figure 1 is a side view of a cart with my invention applied to it, the wheel of the cart nearest the eye being removed. Fig. 2 is plan or top view of the same, the body of the cart being removed.

Similar letters of reference indicate corresponding parts in the two figures.

To enable those skilled in the art to fully understand and construct my invention I will proceed to describe it.

A, represents a cart axle; B, B, the wheels; C, the body connected with the axle in the usual or in any proper way.

To each side of the axle A, a slide bar D, is fitted in proper guides $a$, $a$. These slide bars may be of metal or wood. Metal would probably be the preferable material. The bars D, are allowed to slide freely in the guides $a$, $a$, and their inner ends are slotted transversely as shown at $b$, $b$, the inner ends of the bars being made sufficiently wide to admit of slots of requisite length being made.

To the upper surface of the axle A, a lever E, is attached its fulcrum pin $c$, passing through its center. This lever E, has a pin $d$, projecting down from each end of it and these pins fit in the slots $b$, $b$, of the slide bars D, D. The fulcrum pin $c$, has a square formed on it and it extends up through the bottom of the body C, so that a key F, may be applied to it when required.

The slide bars D, D, must project out sufficiently from the sides of the axle so that they will clear the hubs of the wheels.

From the above description it will be seen that when the vehicle is to be stopped or at any time when it is necessary to apply the brake, the key F, is applied to the fulcrum pin $c$, and the lever E, turned so as to throw the bars D, D, simultaneously outward between the spokes of the wheels. The outward position of the slide bars is shown in red Fig. 2. When the bars are in this position the wheels are effectually prevented from turning, and a horse in running away would be compelled to drag the wheels along over the ground and the increased draft occasioned thereby would be most generally sufficient to tire the animal out before mischief could be done. A person also on entering a vehicle provided with my improvement, can do so without danger of the horse starting, and can even step on the wheel itself without the possibility of its turning. The same may be said in getting out of the vehicle. The invention also obviates the necessity in most cases of tying a horse in the street during brief visits in houses. It will therefore be valuable for physicians. It will also prove valuable applied to carts or drays in loading and unloading, the wheels being effectually prevented from turning and the cart consequently prevented from sliding out of proper position.

The invention is applicable to all wheel vehicles.

One or two slide bars D, may be used, but two would be preferable, and in four wheel vehicles, if desired, a slide bar may be applied to each wheel the slide bars of each axle being connected by any suitable means.

Instead of a lever E, arranged as shown to operate the bars D, a pinion and racks may be employed. Various devices however might be used for actuating the brake bars.

I am aware that it has been proposed to construct the hubs of the wheels of vehicles so large as to admit of perforations on the inner end of the hubs, into which perforations the end of a forked bar might be thrown, to lock the wheel. This method is not applicable to ordinary vehicles because new wheels, with hubs made expressly for the purpose would be necessary. I disclaim such method.

My improvement is readily attached to all vehicles now in use, and can be applied at a small expense, as herein set forth.

Having thus described my invention, what I claim as new and desire to secure by Letters Patent, is—

The combination of the slotted sliding bars D, and rotary lever E, with the axle A, and spokes of the wheels B as and for the purpose herein shown and described.

EDWARD BEHR.

Witnesses:
 MICH. HUGHES,
 CHS. M. HUGHES.